US010152951B2

(12) United States Patent
Waschbuesch et al.

(10) Patent No.: US 10,152,951 B2
(45) Date of Patent: Dec. 11, 2018

(54) METHOD AND SYSTEM FOR INTERACTIVE CONTROL OF WINDOW/LEVEL PARAMETERS OF MULTI-IMAGE DISPLAYS

(75) Inventors: Michael Waschbuesch, Rheinfelden (CH); Peter Munro, Baden-Daettwil (CH)

(73) Assignee: Varian Medical Systems International AG (CH)

(*) Notice: Subject to any disclaimer, the term of this patent is extended or adjusted under 35 U.S.C. 154(b) by 343 days.

(21) Appl. No.: 13/405,353

(22) Filed: Feb. 26, 2012

(65) Prior Publication Data
US 2012/0218290 A1 Aug. 30, 2012

Related U.S. Application Data

(60) Provisional application No. 61/447,667, filed on Feb. 28, 2011.

(51) Int. Cl.
*G09G 5/00* (2006.01)
*G09G 5/377* (2006.01)
(Continued)

(52) U.S. Cl.
CPC ......... *G09G 5/377* (2013.01); *G06F 3/04847* (2013.01); *G06T 5/009* (2013.01);
(Continued)

(58) Field of Classification Search
None
See application file for complete search history.

(56) References Cited

U.S. PATENT DOCUMENTS 5,986,662 A * 11/1999 Argiro ............... G06T 11/00
345/419
6,219,059 B1 * 4/2001 Argiro ............... G06T 11/00
345/424
(Continued)

FOREIGN PATENT DOCUMENTS

CN 2454817 Y 10/2001
CN 101118482 A 2/2008
(Continued)

OTHER PUBLICATIONS

Bier, et al "Toolglass and Magic Lenses: The See-Through Interface", [online], [retrieved Mar. 14, 2013], URL: http://graphics.pixar.com/people/derose/publications/ToolGlass/paper.pdf, 1993.*
(Continued)

*Primary Examiner* — Kee M Tung
*Assistant Examiner* — Patrick F Valdez
(74) *Attorney, Agent, or Firm* — Eric L. Sophir; Dentons US LLP

(57) ABSTRACT

A method, system, and article of manufacture are described for interactive control of multiple images with a high dynamic range that are displayed simultaneously. A medical image control engine provides several synchronous functional capabilities, which comprises an input module, a blending factor synchronization module, a window/level synchronization module, a display module, and an image storage. For window/level adjustment of two images in blended views, the blending factor synchronization module is configured to automatically link the activation of a window/level control of one image with a transparency blending factor that affects both images. For synchronization of window/level adjustments of two or more images, a window/level synchronization module is configured to automatically change window/level parameters of all remaining images when the user makes an adjustment to a window/
(Continued)

level control of one image such that all images with updated window/level parameters are displayed simultaneously.

41 Claims, 11 Drawing Sheets

(51) Int. Cl.
G06T 5/00 (2006.01)
G06T 5/40 (2006.01)
G06F 3/0484 (2013.01)

(52) U.S. Cl.
CPC ........ *G06T 5/40* (2013.01); *F04C 2270/0421* (2013.01); *G06T 2207/10072* (2013.01); *G09G 2340/12* (2013.01); *G09G 2380/08* (2013.01)

(56) References Cited

U.S. PATENT DOCUMENTS

| | | | |
|---|---|---|---|
| 6,429,878 B1* | 8/2002 | Turek | G06T 11/60 345/636 |
| 7,439,974 B2 | 10/2008 | Chihoub et al. | |
| 7,561,736 B2* | 7/2009 | Itokawa | 382/173 |
| 8,160,392 B1* | 4/2012 | Chien | 382/284 |
| 2002/0047849 A1* | 4/2002 | Kamen | G06F 9/4443 345/581 |
| 2002/0171682 A1* | 11/2002 | Frank | G06F 3/0481 715/790 |
| 2004/0013290 A1* | 1/2004 | Krishnan | G06T 5/50 382/128 |
| 2004/0201608 A1 | 10/2004 | Ma et al. | |
| 2005/0065421 A1 | 3/2005 | Burckhardt et al. | |
| 2005/0137477 A1 | 6/2005 | Kockro | |
| 2006/0004275 A1* | 1/2006 | Vija et al. | 600/407 |
| 2006/0133694 A1* | 6/2006 | Dewaele | 382/294 |
| 2007/0182999 A1* | 8/2007 | Anthony | G06T 3/40 358/452 |
| 2007/0276214 A1 | 11/2007 | Dachille et al. | |
| 2008/0298719 A1* | 12/2008 | Sengupta et al. | 382/294 |
| 2009/0115793 A1* | 5/2009 | Beaumont | G09G 5/00 345/581 |
| 2009/0265627 A1* | 10/2009 | Kim et al. | 715/702 |
| 2009/0303249 A1* | 12/2009 | Debevec et al. | 345/617 |
| 2009/0325127 A1* | 12/2009 | Kusch | A61C 1/084 433/201.1 |
| 2010/0033501 A1* | 2/2010 | Whitesell | G06T 13/80 345/634 |
| 2010/0130860 A1 | 5/2010 | Yamagata | |
| 2010/0149367 A1* | 6/2010 | Yim et al. | 348/222.1 |
| 2011/0142370 A1* | 6/2011 | Joshi et al. | 382/307 |
| 2012/0019548 A1* | 1/2012 | Zhu et al. | 345/589 |
| 2013/0121569 A1* | 5/2013 | Yadav | 382/164 |

FOREIGN PATENT DOCUMENTS

| | | |
|---|---|---|
| CN | 101276568 A | 10/2008 |
| WO | 2010/081094 | 7/2010 |
| WO | 2010084390 A1 | 7/2010 |

OTHER PUBLICATIONS

International Search Report corresponding to PCT/IB2012/000362 filed Feb. 27, 2012; 5 pages.
Indian Office Action (with English Translation), dated Apr. 19, 2018, in corresponding Indian Application No. 6879/CHENP/2013, 6 pages.
Supplementary European Patent Office Search Report, dated Oct. 24, 2017, issued in corresponding European Application No. EP 12752124.3, 4 pages.
Extended European Search Report, dated Oct. 6, 2017, issued in corresponding European Application No. 12752124.3, 13 pages.
"eFilm Workstation® 3.2 User's Guide", Jan. 1, 2009, XP055098905, Retrieved from the Inernet: URL:http://www.soundeklin.com/library/media/pdf/eFilm-Workstation-32-Users-Guide.pdf [retrieved on Jan. 28, 2014], pp. 117, 118, 121, 126, 132, and 138; 275 pages.
"VolView 1.3 User's Guide", Mar. 29, 2002, XP007907992, pp. 8-13; 54 pages.
Chinese Search Report, dated Jun. 9, 2015, issued in corresponding Chinese Application No. 201280018307.3, 2 pages.
Chinese Search Report, dated Jan. 5, 2016, in corresponding Chinese Application No. 201280018307.3, 2 pages.

* cited by examiner

METHOD AND SYSTEM FOR INTERACTIVE CONTROL OF WINDOW/LEVEL PARAMETERS OF MULTI-IMAGE DISPLAYS

CROSS REFERENCES TO RELATED PATENT APPLICATIONS

This application claims priority to U.S. Provisional Application Ser. No. 61/447,667 entitled "Method and System for Interactive Control of Window/Level Parameters of Multi-Image Displays," filed on 28 Feb. 2011, the disclosure of which is incorporated herein by reference in its entirety. Commonly-owned U.S. patent application Ser. No. 12/821,977 entitled "Mechanism for Dynamically Propagating Real-Time Alterations of Medical Images," filed 23 Jun. 2010, now U.S. Pat. No. 9,401,051, U.S. patent application Ser. No. 12/821,985 entitled "Mechanism for Advanced Structure Generation and Editing," filed 23 Jun. 2010, and U.S. patent application Ser. No. 12/925,663 entitled "Visualization of Deformations Using Color Overlays," filed 27 Oct. 2010, now U.S. Pat. No. 9,996,929, are hereby incorporated by reference in their entireties into the present patent application.

TECHNICAL FIELD

The present invention relates generally to medical imaging processing, and more particularly to interactive control of window/level adjustments of multiple images when displaying images simultaneously or in a blended view.

BACKGROUND ART

Medical image scanners like x-ray, computerized tomography (CT), cone beam computerized tomography (CBCT), magnetic resonance imaging (MRI), positron emission tomography (PET), or ultrasound typically acquire raw intensity values in a very high dynamic range. For instance, several commercially available computed tomography scanners are able to cover a range of about 4,000 different intensities. This high dynamic range is usually too large to fit most display devices. It is practical, therefore, to map the high dynamic range to a smaller intensity interval, such as the 256 different gray-scale values of a typical computer monitor. This can be accomplished by choosing a continuous range of interest out of the full input intensity range by setting two parameters: the width of the range, also referred to as "window," and the center of the range, also referred to as "level." For displaying an image, all input intensities within that range are then continuously mapped to the full range of output intensities. Input intensities below and above that range are mapped to the minimal and maximal output intensities. This mapping technique is not only employed to address the above-mentioned described technical limitations of display devices but also factors in that the human eye is not sufficiently sensitive to differentiate between all input intensities. Choosing a small intensity window allows for enhancing image contrast in a specific range of interest while masking out all other intensities that may not contain relevant information. The output from the described mapping technique is not constrained to gray scale values. The intensity window can also establish a mapping between the input values and a user-defined color map.

Several different approaches are possible in selecting suitable window and level parameters. Various algorithms have been developed for determining those values automatically based on image content, display properties, and a desired case. However, most display systems additionally include tools for setting those values manually, e.g. by entering numbers or by moving sliders, for situations where an automatic algorithm is not able to produce the target result.

Accordingly, it is desirable to have a system and method for simplifying the manual window/level adjustments in the simultaneous display of two or more images for medical image applications and instrumentations.

SUMMARY OF THE INVENTION

The present invention is directed to a method, system, and article of manufacture for interactive control of multiple images with a high dynamic range that are displayed simultaneously for which software automation processes are programmed to reduce the complexity in managing and viewing the post window/level adjustment of the multiple images. A medical image control engine is configured to provide several synchronous functional capabilities, which comprises an input module, a blending factor synchronization module, a window/level synchronization module, a display module, and an image storage. In a first scenario with window/level adjustment of two images in blended views where two images are displayed as semi-transparent overlays, the blending factor synchronization module is configured to automatically link the activation of a window/level control of one image with a transparency blending factor that affects both images. In radiotherapy, such views are for example used for patient positioning. At the beginning of each treatment fraction, the patient is positioned at the treatment machine and a CBCT is acquired. This image is displayed in a blended view together with the initial CT that has been used for treatment planning. The deviations between the two images are then used for correcting the patient's position to comply with the treatment plan. In a second scenario with synchronization of window/level adjustments of two or more images, a window/level synchronization module is configured to automatically change window/level parameters of all remaining images when the user makes an adjustment to a window/level control of one image such that all images with updated window/level parameters are displayed simultaneously, or substantially simultaneously. In the radiotherapy example this can be used to display all positioning CBCTs side by side for visualizing tumor progression over treatment time.

In a first aspect of the invention, the medical image control engine is configured to automatically adjust the degree of transparency of a non-affected image in response to a deliberate action to interact with the window/level control of an affected image. The affected image becomes fully opaque while the non-affected image becomes fully transparent so that the affected image is capable of shining through the non-affected image. In a blended view of two images, the transparency of one image has an inverse relationship with the transparency of another image, such that when one image is fully opaque, the other image is fully transparent. The activation of the window/level controls of an affected image is linked to the movement of the transparency blending factor so that the interaction with the window/level controls of the affected image automatically causes the transparency blending factor to slide all the way in one direction. If the user selects to adjust the window/level parameters of the first image, the first image becomes fully opaque because the transparent blending factor is at 0% for the first image while the second image becomes fully transparent because the transparent blending factor is at 100% for the second image. If the user selects to adjust the window/level parameters of the second image, the second image becomes fully opaque because the transparent blending factor is at 0% for the second image while the first image becomes fully transparent because the transparent blending factor is at 100% for the first image. The transparency state is retained so long as the user is interacting with the window/level control of the first image or the window/level control of the second image. The degree of transparency blending factor is reset to its original value after the user has finished interacting with the window/level control associated with a particular image.

In a second aspect of the invention, the medical image control engine is configured to provide a synchronous interactive modification of the window/level parameters for multiple images. When the user interacts with the window/level control associated with a particular image, the window/level synchronization module not only adjusts the window/level parameters of that image, but also propagates the changes to all other images. As a result, all image views and window/level parameters are automatically updated. If the system displays N images, when the window/level parameters to one of the N images are adjusted (the selected image), the system executes the N−1 synchronization mechanisms to the unselected images (a sum of N−1 images). Such a synchronization mechanism can be implemented using in a wide variety of techniques, e.g. a general mapping method, a pass-through method, and a histogram equalization method.

Broadly stated, a computer-implemented method for adjusting a plurality of images comprises: displaying a first image and a second image in a blended view on a display, the first image associated with first window/level parameters and the second image associated with second window/level parameters; adjusting the first window/level parameters of the first image thereby causing a transparency blending factor to change to a first value; and displaying the first and second images in the blended view on the display based on the adjustments to the first window/level parameters and the transparency blending factor.

The present invention provides a method to effectively automate the display of two medical images when a user adjusts the window/level of one image without the need to manually adjust the transparency blending factor.

The structures and methods of the present invention are disclosed in the detailed description below. This summary does not purport to define the invention. The invention is defined by the claims. These and other embodiments, features, aspects, and advantages of the invention will become better understood with regard to the following description, appended claims, and accompanying drawings.

BRIEF DESCRIPTION OF THE DRAWINGS

The invention will be described with respect to specific embodiments thereof, and reference will be made to the drawings, in which.

DETAILED DESCRIPTION

Figure 1:
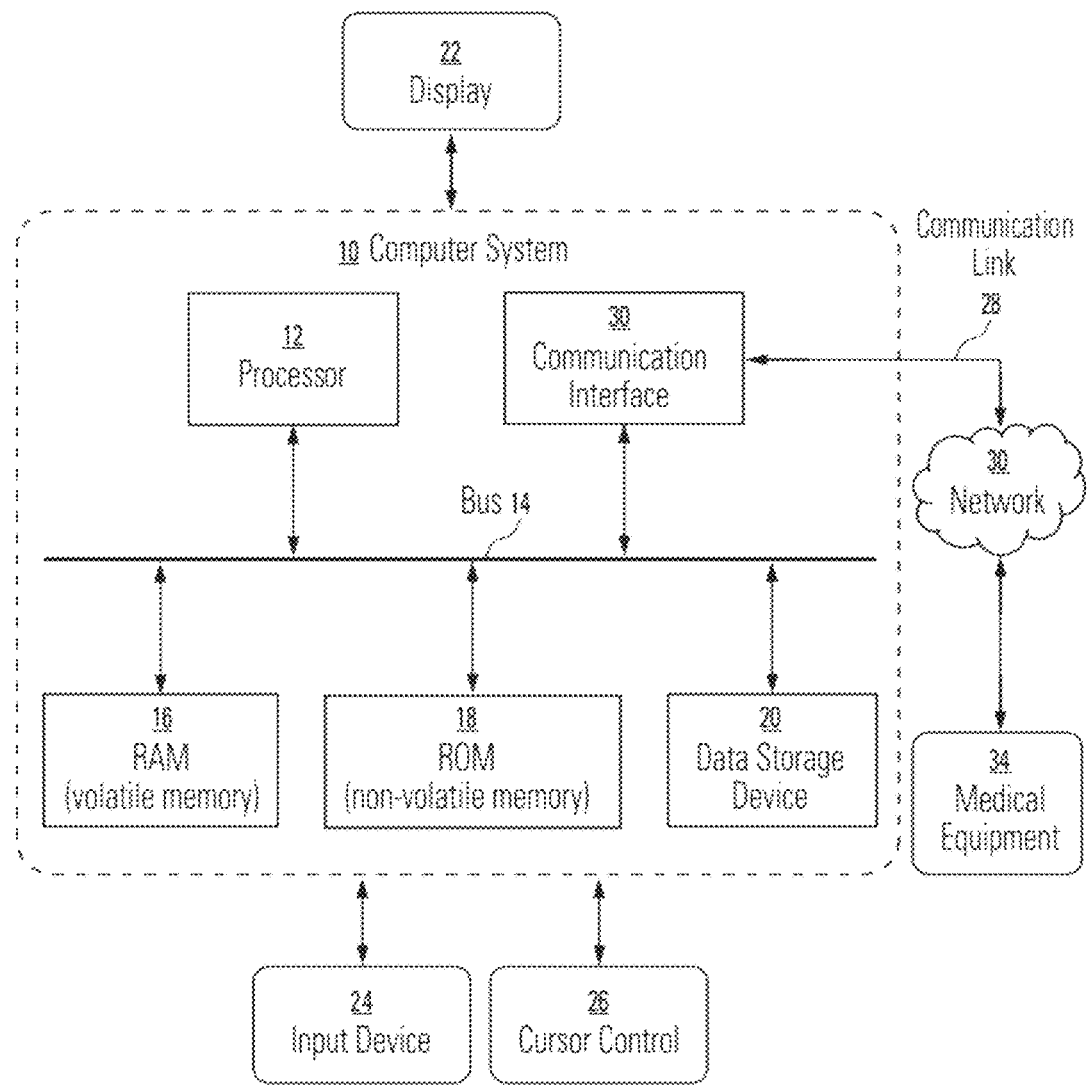
FIG. 1 is a block diagram illustrating a first system embodiment of an exemplary interactive computer system for adjusting window/level parameters of multiple image displays in accordance with the present invention.

A description of structural embodiments and methods of the present invention is provided with reference to FIGS. 1-11. It is to be understood that there is no intention to limit the invention to the specifically disclosed embodiments but that the invention may be practiced using other features, elements, methods, and embodiments. Like elements in various embodiments are commonly referred to with like reference numerals.

FIG. 1 is a block diagram that illustrates an exemplary interactive computer system for adjusting window/level parameters of multiple image displays upon which a system embodiment of the invention may be implemented. A computer system 10 includes a processor 12 for processing information, and the processor 12 is coupled to a bus 14 or other communication medium for sending and receiving information. The processor 12 may be an example of the processor 12 of FIG. 1, or another processor that is used to perform various functions described herein. In some cases, the computer system 10 may be used to implement the processor 12 as a system-on-a-chip integrated circuit. The computer system 10 also includes a main memory 16, such as a random access memory (RAM) or other dynamic storage device, coupled to the bus 14 for storing information and instructions to be executed by the processor 12. The main memory 16 also may be used for storing temporary variables or other intermediate information during execution of instructions by the processor 12. The computer system 10 further includes a read only memory (ROM) 18 or other static storage device coupled to the bus 14 for storing static information and instructions for the processor 12. A data storage device 20, such as a magnetic disk (e.g., a hard disk drive), an optical disk, or a flash memory, is provided and coupled to the bus 14 for storing information and instructions. The computer system 10 (e.g., desktops, laptops, tablets) may operate on any operating system platform using Windows® by Microsoft Corporation, MacOS or iOS by Apple, Inc., Linux, UNIX, and/or Android by Google Inc.

The computer system 10 may be coupled via the bus 14 to a display 22, such as a flat panel for displaying information to a user. An input device 24, including alphanumeric, pen or finger touchscreen input, and other keys, is coupled to the bus 14 for communicating information and command selections to the processor 12. Another type of user input device is cursor control 26, such as a mouse (either wired or wireless), a trackball, a laser remote mouse control, or cursor direction keys for communicating direction information and command selections to the processor 12 and for controlling cursor movement on the display 22. This input device typically has two degrees of freedom in two axes, a first axis (e.g., x) and a second axis (e.g., y), that allows the device to specify positions in a plane.

The computer system 10 may be used for performing various functions (e.g., calculation) in accordance with the embodiments described herein. According to one embodiment, such use is provided by the computer system 10 in response to the processor 12 executing one or more sequences of one or more instructions contained in the main memory 16. Such instructions may be read into the main memory 16 from another computer-readable medium, such as storage device 20. Execution of the sequences of instructions contained in the main memory 16 causes the processor 12 to perform the process steps described herein. One or more processors in a multi-processing arrangement may also be employed to execute the sequences of instructions contained in the main memory 16. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 12 for execution. Common forms of computer-readable media include, but are not limited to, non-volatile media, volatile media, transmission media, a floppy disk, a flexible disk, a hard disk, magnetic tape, any other magnetic medium, a CD-ROM, a DVD, a Blu-ray Disc, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read. Non-volatile media includes, for example, optical or magnetic disks, such as the storage device 20. Volatile media includes dynamic memory, such as the main memory 16. Transmission media includes coaxial cables, copper wire, and fiber optics. Transmission media can also take the form of acoustic or light waves, such as those generated during radio wave and infrared data communications.

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a communication link 28. The computer system 10 includes a communication interface 30 for receiving the data on the communication link 28. The bus 14 carries the data to the main memory 16, from which the processor 12 retrieves and executes the instructions. The instructions received by the main memory 16 may optionally be stored on the storage device 20 either before or after execution by the processor 12.

The communication interface 30, which is coupled to the bus 14, provides a two-way data communication coupling to the network link 28 that is connected to a communication network 32. For example, the communication interface 30 may be implemented in a variety of ways, such as an integrated services digital network (ISDN), a local area network (LAN) card to provide a data communication connection to a compatible LAN, a Wireless Local Area Network (WLAN) and Wide Area Network (WAN), Bluetooth, and a cellular data network (e.g. 3G, 4G). In wireless links, the communication interface 30 sends and receives electrical, electromagnetic or optical signals that carry data streams representing various types of information.

The communication link 28 typically provides data communication through one or more networks to other devices. For example, the communication link 28 may provide a connection through the communication network 32 to a medical equipment 34 such as an x-ray scanner, a CT scanner, a CBCT scanner, an MRI scanner, a PET scanner, an ultrasound scanner, or an image archive such as a PACS system. The image data streams transported over the communication link 28 can comprise electrical, electromagnetic or optical signals. The signals through the various networks and the signals on the communication link 28 and through the communication interface 30, which carry data to and from the computer system 10, are exemplary forms of carrier waves transporting the information. The computer system 10 can send messages and receive data, including image files and program code, through the network 32, the communication link 28, and the communication interface 30.

Alternatively, image files can be transported manually through a portable storage device like a USB flash drive for loading into the storage device 20 or main memory 16 of the computer system 10, without necessarily transmitting the image files to the communication interface 30 via the network 32 and the communication link 28.

Figure 2:
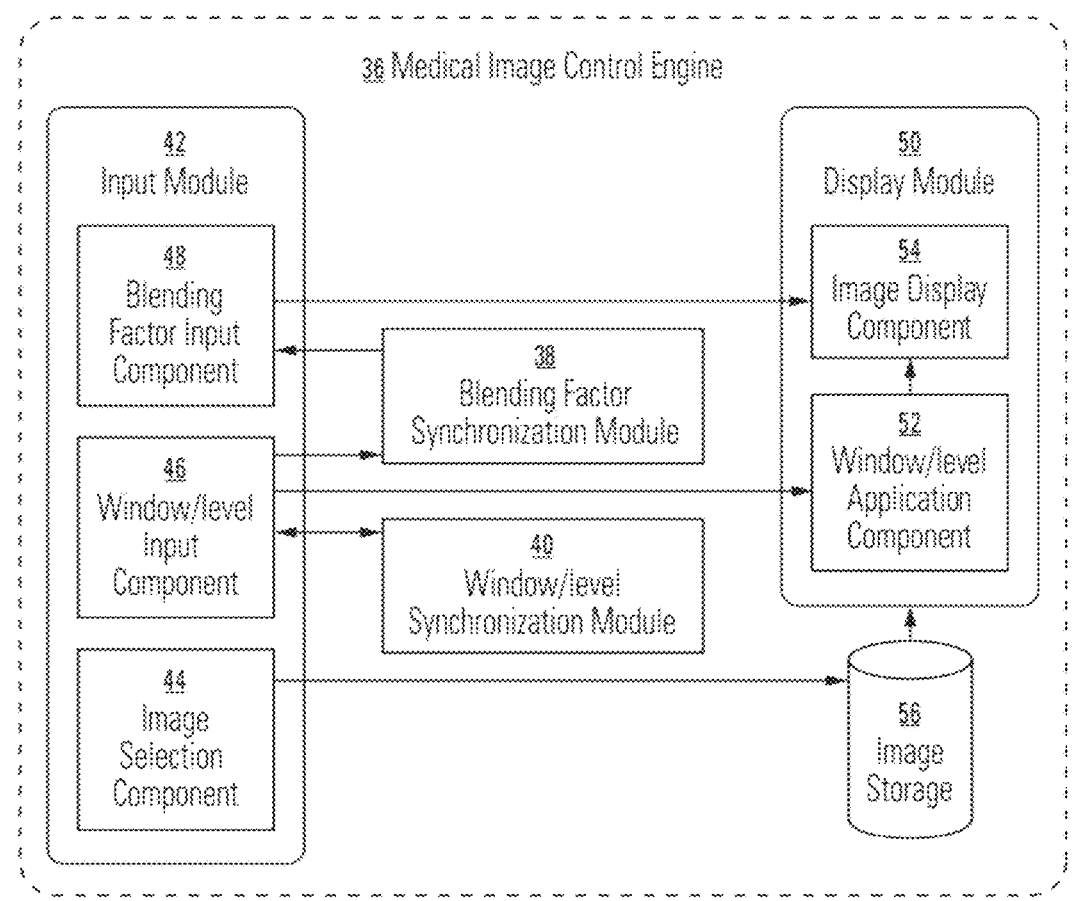
FIG. 2 is a block diagram illustrating an exemplary multi-image control engine in accordance with the present invention.

FIG. 2 is a block diagram illustrating an exemplary medical image control engine 36 that includes a blending factor synchronization module 38 and a window/level synchronization module 40. The medical image control engine 36 also includes an input module 42 and a display module 50, where the input module 42 contains an image selection component 44, a window/level input component 46, and a blending factor input component 48, and the display module 50 contains a window/level component 52, an image display component 54, and an image storage 56. In a standard image display, the user selects an image using the image selection component 44. The selected image is then loaded from the image storage 56 and transmitted to a window/level module component 52. The window/level component 52 is configured to convert the raw pixel intensities to display intensities using the parameters from the window/level input 46. The image display component 54 then displays the converted intensities on the display 22. In one embodiment, the medical image control engine 36 resides in the RAM memory 16 executable by the processor 12. In another embodiment, the medical image control engine 36, implemented either in software or hardware, that is stored or designed in the non-volatile memory 18 for loading and execution by the processor 12.

Optionally, the user may display multiple images at the same time. In such a case, there are multiple instances of the window/level input components 46, the window/level components 52, and the image display 56. If the user chooses to display multiple images in a blended view, the blending factor input component 48 can be configured to adjust the image transparencies.

The blending factor synchronization module 38 and the window/level synchronization module 40 are configured on the memory 16 for operation by simulating one or more user inputs. If the user adjusts one specific control, other controls in the input module 42 adjust automatically, which subsequently leads to updates in the display module 50.

In one embodiment, described as a blending factor synchronization with a blended view, the blending factor synchronization module 38 is configured on the memory 16 to detect whenever the user manipulates a window/level input control. As soon as this happens, the blending factor synchronization module 38 is configured on the memory 16 to adjust the blending input control to fully display one single image in a blended view. When the user stops using the window/level input 46, the blending factor control is reset again to its previous (or original) state.

In another embodiment, described as a window/level synchronization with a multi-image display, the user may activate the window/level synchronization module 40. The window/level synchronization module 40 is configured to receive manual changes made in one of the multiple window/level inputs 46. The window/level synchronization module 40 is configured to correspondingly adjust all other window/level inputs 46 to correlative values in which all images are displayed with corresponding brightness and contrast. Depending on the algorithm, the window/level synchronization module 40 may need to obtain data from other modules. For example, the histogram equalization routine is dependent on the converted image intensities coming from the window/level application component 52. More general algorithms may need more data such as image metadata from the image storage 56. The simple pass-through algorithm on the other hand does not depend on any data besides the input window/level parameters.

It will readily be appreciated by one of ordinary skill in the art that there are multiple possible combinations for the herein described component applications and modules. For example, the blending factor synchronization module and window/level synchronization module may also function as a standalone application, separate from the image storage 56. Although the medical image control engine 36 is described as being comprised of various components (e.g., the input module 42, the blending factor synchronization module 38, the window/level synchronization module 40, the display module 50, and the image storage 56), fewer or more components may comprise the medical image control engine 36 and still fall within the scope of various embodiments.

Figure 3:
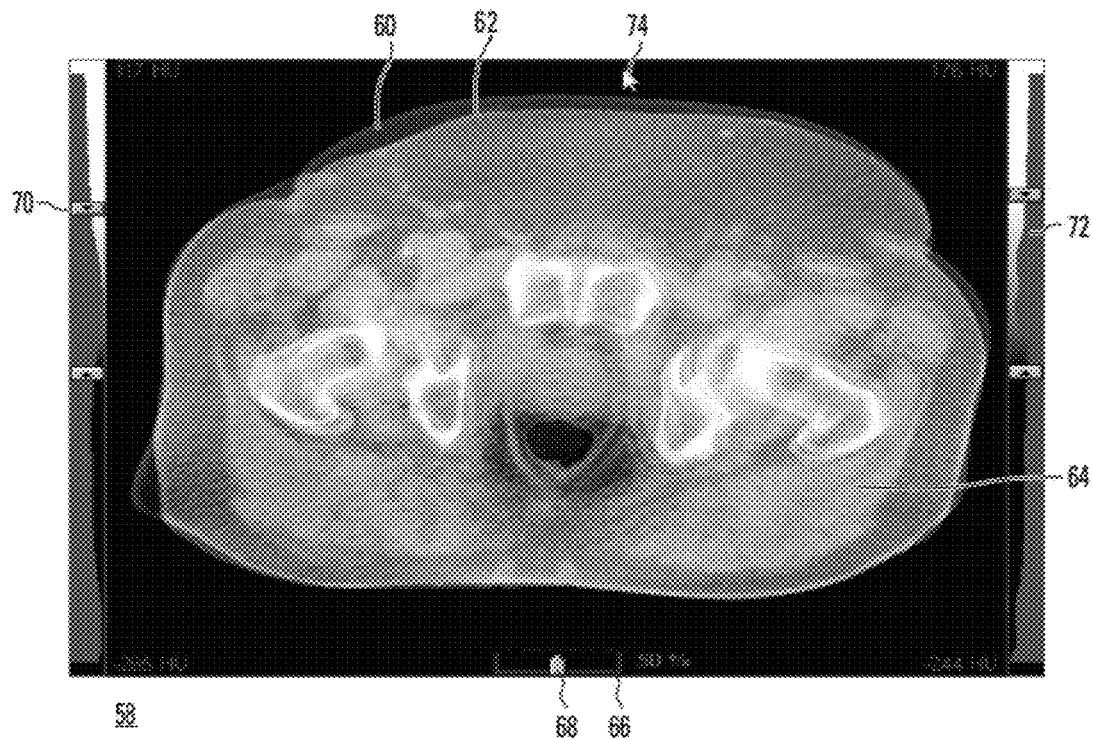
FIG. 3 is a screen shot illustrating a window/level adjustment platform of the images in a blended view without any window/level adjustment in accordance with the present invention.

FIG. 3 is a screen shot 58 illustrating a window/level adjustment platform of images 60, 62 (also referred to as "first medical image" or "image A," and "second medical image" or "image B") in a blended view 64 without any window/level adjustment. One embodiment of the images 60, 62 refers to medical images captured by the medical equipment 34. The present invention is not limited to medical images, but other images are also applicable, such as photographs. An example of a medical image is captured by a CT scanner that emits radiation toward a patient to be imaged. CT scanning is used in a variety of medical fields, such as in radiology, cardiology, and oncology, to diagnose conditions and diseases, as well as to plan radiation treatments.

In blended views, two images 60, 62 are present at the same time that showing both images 60, 62 semi-transparently overlaid on top of each other. In this illustration, a CT scanner is used to capture the first medical image 60 and the second medical image 62. The first medical image 60 and the second medical image 62 are often not exactly aligned to one another, as is the case here, due in part to a patient's orientation and position on a table and the sampling geometry of the CT scanner. By observing the edges of the medical images 60, 62, the first medical image 60 has a northward geometry boundary that extends above the second medical image, as well as portions in the southwest direction and the east direction.

Figure 4A:
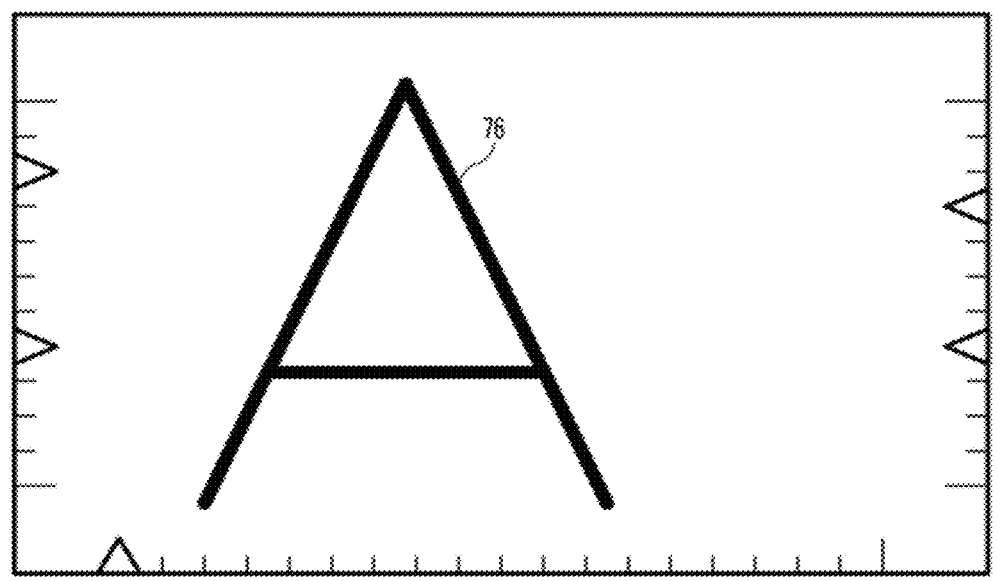
FIG. 4A is a pictorial diagram illustrating a blending image view with window/level and blending factor controls in accordance with the present invention.
Figure 4B:
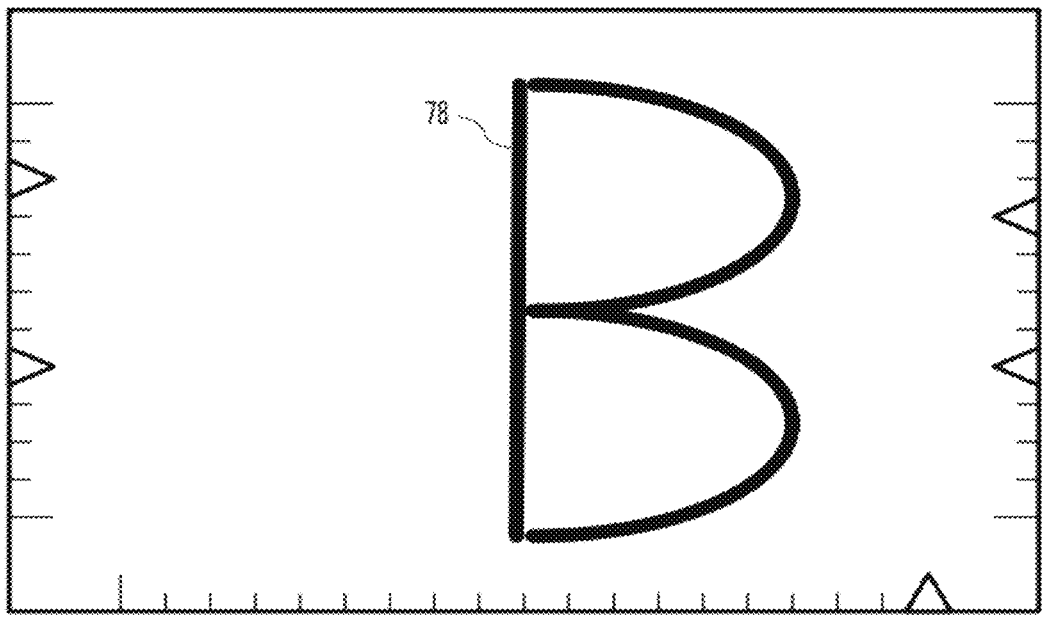
FIG. 4B is a pictorial diagram illustrating a blending image view with the blending factor set to zero in accordance with the present invention.
Figure 4C:
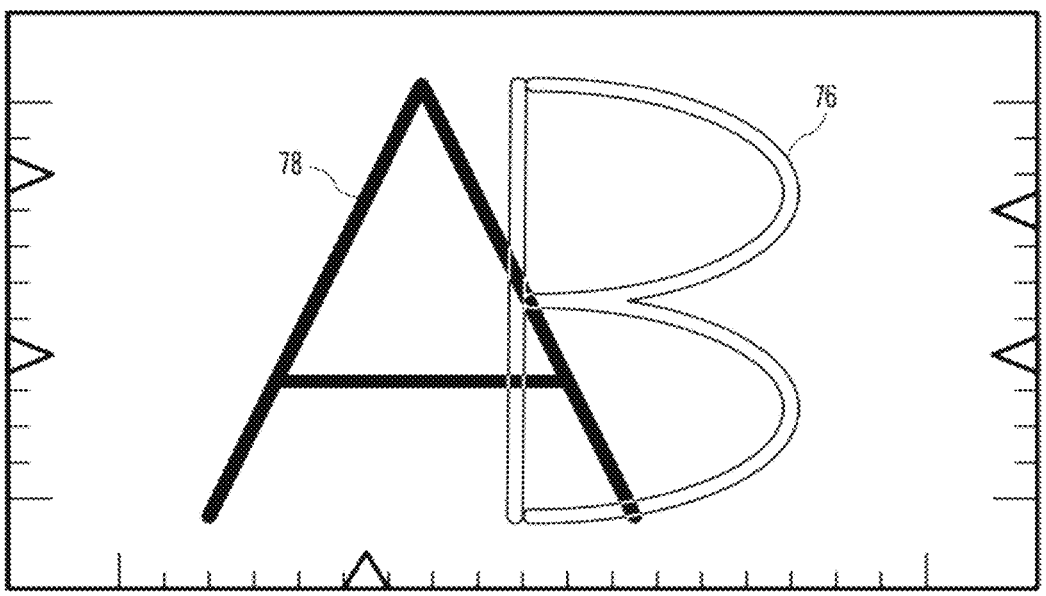
FIG. 4C is a pictorial diagram illustrating a blending image view with the blending factor set to one in accordance with the present invention.

The degree of transparency can be chosen continuously between a value of 0, where the first medical image 60 is fully opaque while the second medical image 62 is fully transparent, and a value of 1, where the first medical image 60 is fully transparent while the second medical image 62 is fully opaque. A transparency slider 66 (also referred to as "transparency blending factor" or "blending factor") has a pointer 68 to indicate the degree of the transparency. When the pointer 68 is moved completely toward the left end of the transparency slider 66, the first medical image 60 is shown and the second medical image 62 is not shown. A sample illustration utilizing the same principle as the invention but with an image character content rather than an image from a patient is shown in FIG. 4A. An alphabet letter A 76 represents the first medical image 60 and an alphabet letter B 78 represents the second medical image 62. The alphabet letter A 76 is completely opaque while the alphabet letter B 78 is completely transparent. When the pointer 68 is moved completely toward the right end of the transparency slider 66, the second medical image 62 is shown and the first medical image 62 is not shown. In the sample illustration in FIG. 4B, the alphabet letter B 78 is completely opaque while the alphabet letter A 76 is completely transparent. If the pointer 68 is placed in the middle of the transparency slider 66, which has a value of 0.5, both the first medical image 60 and the second medical image 62 are shown with the same 50% transparency. As illustrated in FIG. 4C, both the alphabet letter A 76 and the alphabet letter B 78 are shown, but each of the alphabet letters A 76 and B 78 is 50% transparent and 50% opaque.

The window/level parameters for the first medical image 60 and the second medical image 62 can be chosen separately. To provide this functionality, the user interface has to contain two controls 70, 72 for that purpose, the first window/level control 70 adjusting the window/level of the first medical image 60 and the second window/level control 72 adjusting the window/level of the second medical image 62. The first window/level control 70 is linked to the transparency slider 66 and has a corresponding functional relationship with the transparency slider 66. When a mouse cursor 74 moves the first window/level control 70 of the first medical image 60, the transparency slider 66 is adjusted automatically and proportionally so that the affected image (i.e., the first medical image 60) becomes completely opaque and the non-affected image (i.e., the second medical image 62) becomes completely transparent. Similarly, the second window/level control 72 is linked to the transparency slider 66 and has a corresponding functional relationship with the transparency slider 66. When the mouse cursor 74 moves the second window/level control 72 of the second medical image 62, the transparency slider 66 is adjusted automatically and proportionally so that the affected image (i.e., the second medical image 62) becomes completely opaque and the non-affected image (i.e., the first medical image 60), becomes completely transparent.

The term "automatic adjustment" is broadly construed to include, but not be limited to, either of the following definitions: once initiated by a window/level control, the transparency function of the images is performed by a machine, without the need for manually performing the function; in a manner that, once begun, is largely or completely without human assistance.

Various embodiments are possible in determining a start action and an end action of the window/level interaction. In one embodiment, the mouse cursor 74 (also referred to as "mouse pointer 74") is used to interact with the window/level parameters which are based on the position of the mouse pointer 74. As soon as the mouse pointer 74 enters the area of the first window/level control region 70 or the second window/level control region 72, the transparency blending factor 66 is adjusted proportionally. As soon as the mouse pointer 74 leaves the area of the first window/level control region 70 or the second window/level control region 72, the transparency blending factor 66 is reset to its original value (or a predetermined value). The process of adjusting and resetting the transparency blending factor 66 can be done in two ways: the factor can change either instantaneously or more slowly during an animated transition phase. The latter makes it easier for the user to understand the full concept.

Figure 5:
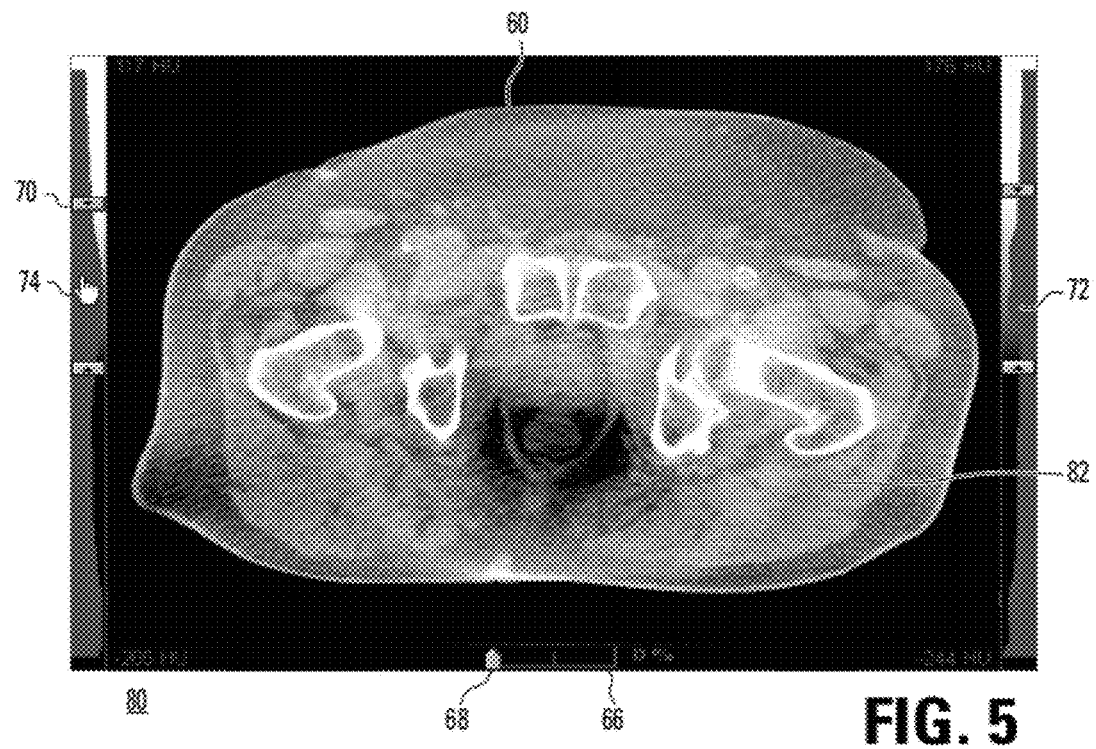
FIG. 5 is a screen shot illustrating a window/level adjustment of a first image on the blended-image display with respect to FIG. 3 in accordance with the present invention.

FIG. 5 is a screen shot 80 illustrating a composite blended view 82 with a window/level adjustment of the first medical image 60 with respect to FIG. 3. The mouse cursor 74 is pointed at the first window/level control 70 to a position which automatically causes the pointer 68 to move all the way to the left to produce the transparency factor 66 of 0%. As a result, the composite blended view 82 shows the first medical image 60 to be completely opaque and the second medical image 62 to be completely transparent. The pointing of the mouse cursor 74 to the first window/level control 70 affects the first medical image 62 but does not affect the second medical image 62. With the act of placing the mouse cursor 74 to the first window/level control region 70 to change the window/level values, the blending factor synchronization module 38 automatically adjusts the pointer 68 on the transparency slider 66 to display the blended view 82 showing the first medical image 60 as being fully opaque and the second medical image 62 as being fully transparent. The mouse cursor 74 is intended as an example of an input device for adjusting the window/level controls 70, 72. Other forms of input devices are also operable with the present invention, such as an alphanumeric keyboard, in which alphanumeric keys can indicate the various functionalities that parallel the pointer movement of the mouse cursor 74 for changing the parameters of the window/level controls 70, 72 associated with the first medical image 60 and the second medical image 62, respectively.

Figure 6:
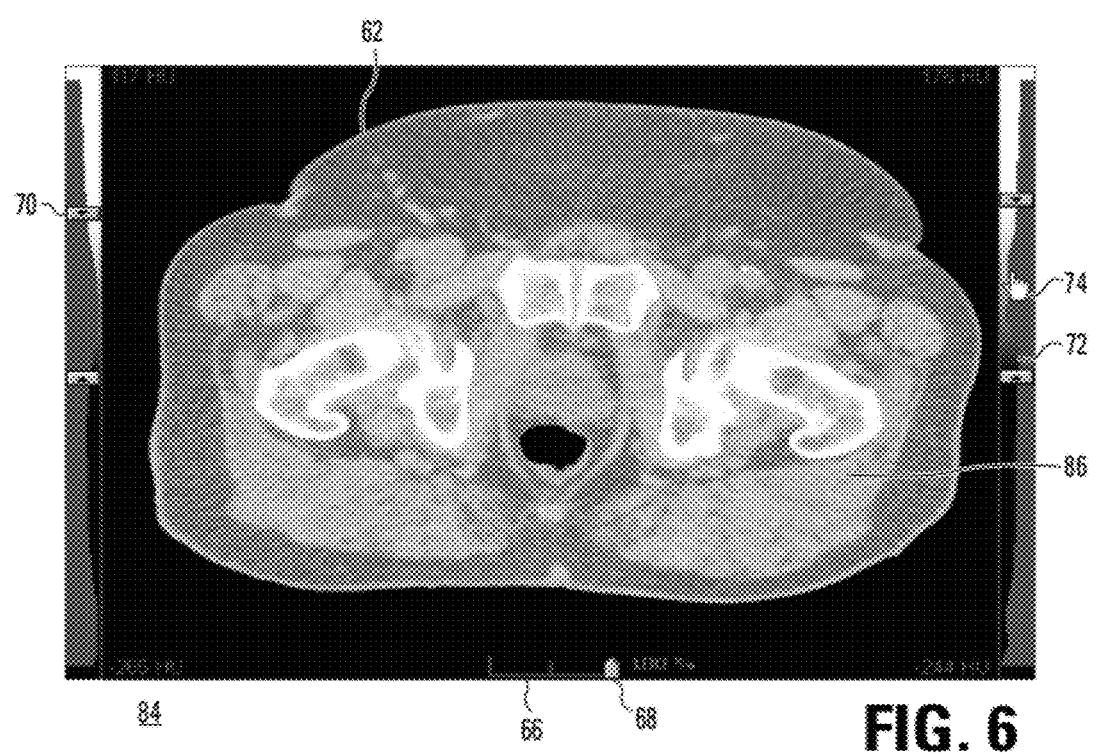
FIG. 6 is a screen shot illustrating a window/level adjustment of a second image on the blended-image display with respect to FIG. 3 in accordance with the present invention.

FIG. 6 is a screen shot 84 illustrating a composite blended view 86 with a window/level adjustment of the second medical image 62 with respect to FIG. 3. The mouse cursor 74 is pointed at the second window/level control 72 to a position which automatically causes the pointer 68 to move all the way to the right to produce the transparency factor 66 of 100%. As a result, the composite blended view 86 shows the second medical image 62 to be completely opaque and the first medical image 60 to be completely transparent. Pointing the mouse cursor 74 to the second window/level control 72 affects the second medical image 62 but does not affect the first medical image 60. With the act of placing the mouse cursor 74 to the second window/level control region 72 to change the window/level values, the blending factor synchronization module 38 automatically adjusts the pointer 68 on the transparency slider 66 to display the blended view 86 showing the second medical image 62 as being fully opaque and the first medical image 60 as being fully transparent.

The first window/level control 70 and the second window/level control 72 in the illustrated embodiment are implemented by visually displaying the first window/level control 70 as a first slider on the left side of the images 60, 62 and the second window/level control 72 as a second slider on the right side of the images 60, 62. The first and second window/level controls 70, 72 for adjusting the window/level do not have to be sliders. In some embodiments, other suitable controls such as a numerical input or dials can be used to function as the window/level controls. In some embodiments, the window/level controls can just be identified areas or a particular region (crop or a sub-region selectable by user) that represent certain portions on the display 22, such as a left area of the images 60, 62 (or different quadrants) on the display 11 and the right area of the images 60, 62 on the display 22 without any additional visual indication. These identified areas on the display 22 can be invisible (also referred to as invisible visually), but the user is able to move the mouse cursor 74 within a particular identified area or region on the display 22 to activate a window/level control that is associated with the particular identified area by, for example, clicking on the mouse cursor 74, for making transparency or opaqueness adjustment as described in the present invention. The user may change the window/level parameters by, for example, pressing and holding one mouse button and moving the mouse, in a horizontal motion or a vertical motion, within such an area.

It is contemplated within the present invention to combine additional functional features with the transparency adjustment. One example is to combine a zooming function with a transparency function, and apply the zooming/transparency (also referred to zooming+transparency) combination to a particular region or sub-region. Implementation of such combinational zooming/transparency feature can be carried out in a variety of methods. In one approach, when the user moves the mouse cursor 74 within a particular sub-region (or a particular region) of an medical image (either the first medical image 60 or the second medical image 62) to activate a window/level control associated with the particular sub-region of the medical image, the particular sub-region of the medical image becomes more fully transparent and the zooming factor increases simultaneously, resulting in a higher transparent and close-up view of the medical image. To phrase it as a method concept, the blending factor synchronization module 38 is configured to perform the zooming/transparency function to a particular sub-region on the first medical image 60 or the second medical image 62.

Figure 7:
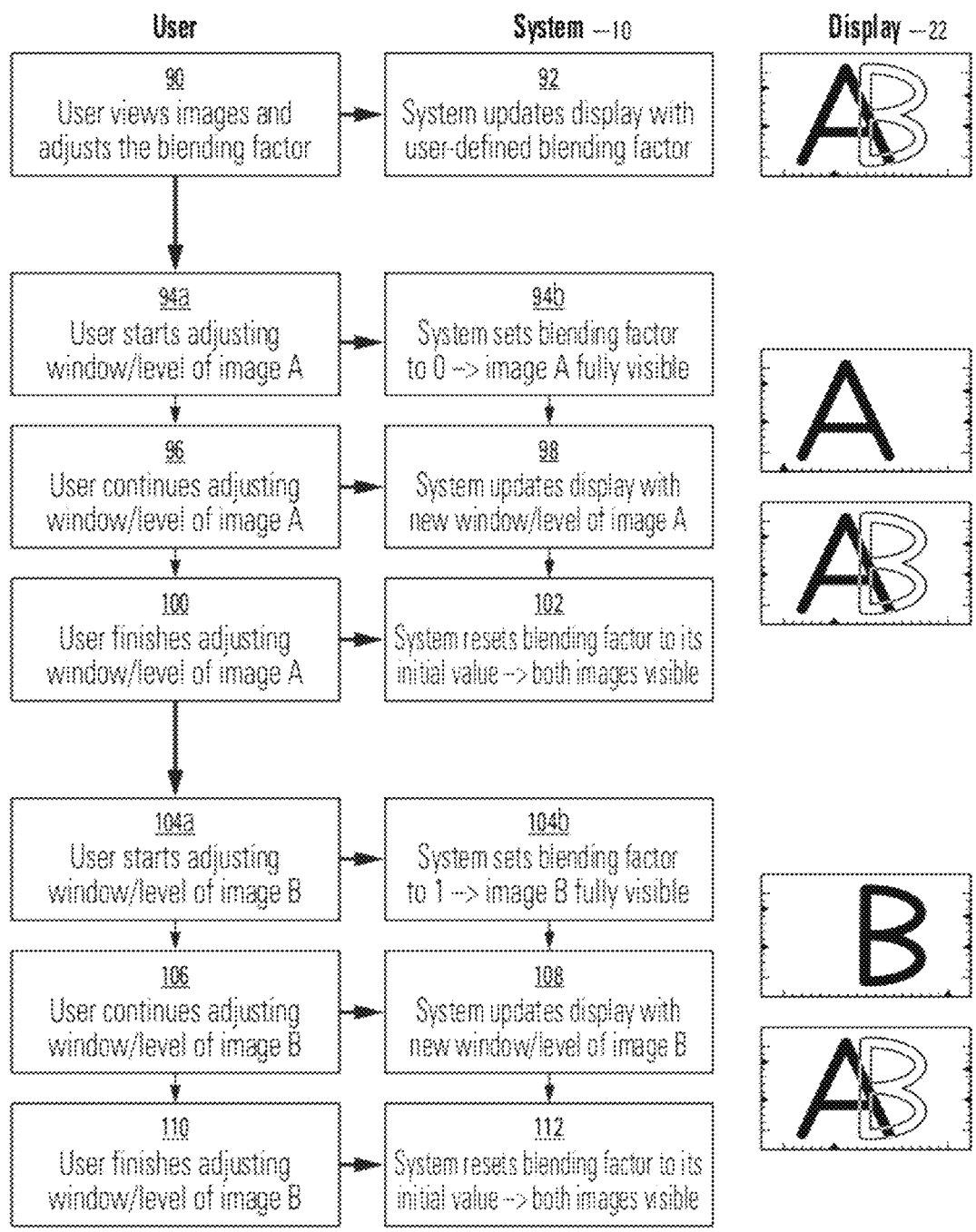
FIG. 7 is a flow diagram illustrating an exemplary process for executing a window/level adjustment in blended views in accordance with the present invention.

FIG. 7 is a flow diagram 88 illustrating an exemplary process for executing a window/level adjustment in blended views. At step 90, the user views the first medical image 60 and the second medical image 62, and adjusts the transparency blending factor 66 to a value that the user prefers. The processor 12, at step 92, updates the display 22 with the user-defined blending factor, as illustrated with image character content where the letter A corresponds to the first medical image 60 and the letter B corresponds to the second medical image 62. The display 22 shows both letters A and B in a blending view based on the user-defined blending factor. At step 94a, the user begins to adjust the first window/level parameters associated with the first medical image 60 by moving the mouse cursor 74 into the first window/level control region 70. At step 94b, which occurs simultaneously (or substantially simultaneously) with step 94a, the blending factor synchronization module 38 automatically sets the transparency blending factor 66 to zero in response to the placement of the mouse cursor 74 within the boundary (or within the vicinity) of the first window/level control region 70. The first medical image 60 becomes fully visible, while the second medical image is not visible, which is illustrated with the showing of only letter A, not letter B, in the display 22.

At step 96, the user continues to adjust the first window/level parameters of the first medical image 60 by moving the mouse cursor 74 within the boundary of the first window/level control region 70. At step 98, the processor 12 of the computer system 10 updates the display 22 with updated window/level parameters associated with the first medical image 60. At step 100, the user finishes adjusting the first window/level parameters of the first medical image 60. The processor 12 resets the transparency blending factor 66 to its initial value, resulting in the showing of letters A and B in the display 22.

After the completion in adjusting the first medical image 60, the user proceeds to adjust the second medical image 62. At step 104a, the user begins to adjust the second window/level parameters associated with the second medical image 62 by moving the mouse cursor 74 into the second window/level control region 72. At step 104b, which occurs simultaneously (or substantially simultaneously) with step 104b, the blending factor synchronization module 38 automatically sets the transparency blending factor 66 to one in response to the placement of the mouse cursor 74 within the boundary (or in the vicinity) of the second window/level control region 72. The second medical image 62 becomes fully visible, while the first medical image is not visible, which is illustrated with the showing of only letter B, not letter A, in the display 22.

At step 106, the user continues to adjust the second window/level parameters of the second medical image 62 by moving the mouse cursor 74 within the boundary of the second window/level control region 72. At step 108, the processor 12 of the computer system 10 updates the display 22 with updated second window/level parameters for the second medical image 62. At step 110, the user finishes adjusting the second window/level parameters of the second medical image 62. The processor 12 resets the transparency blending factor 66 to its initial value, resulting in the showing of letters A and B in the display 22.

The sequence in the process flow 88 is intended to illustrate one embodiment, which includes the steps in which the system 10 updates a user-defined blending factor, the system 10 adjusts the first window/level parameters in the first medical image 60, and the system 10 adjusts the second window/level parameters in the second medical image 62. These three sequences can be altered as an alternative process flow. For example, one alternative process flow is for the system 10 to update a user-defined blending factor, the system 10 to adjust the second window/level parameters in the second medical image 62, and the system 10 to adjust the first window/level parameters in the first medical image 60. Another alternative process flow is to place the process step where the system 10 updates a user-defined blending factor between the two sequences: the system 10 adjusting the first window/level parameters in the first medical image 60 and the system 10 adjusting the second window/level parameters in the second medical image 62.

In some embodiments, rather than utilizing the blending factor synchronization module 38 in which the transparency and opaqueness of the first image 60 and the second image 62 can be characterized as synchronized, the medical image control engine 36 includes an adjustment module configured to independently change the transparency of each of the two medical images 60, 62. The activation of the window/level controls of a first image that is linked to the movement of the transparency blending factor no longer causes an inverse relationship in a second image. The first image is effectively unsynchronized with the second image where the adjustment module is configured to adjust the degree of transparency (or the degree of opaqueness) of each image independently.

Figure 8:
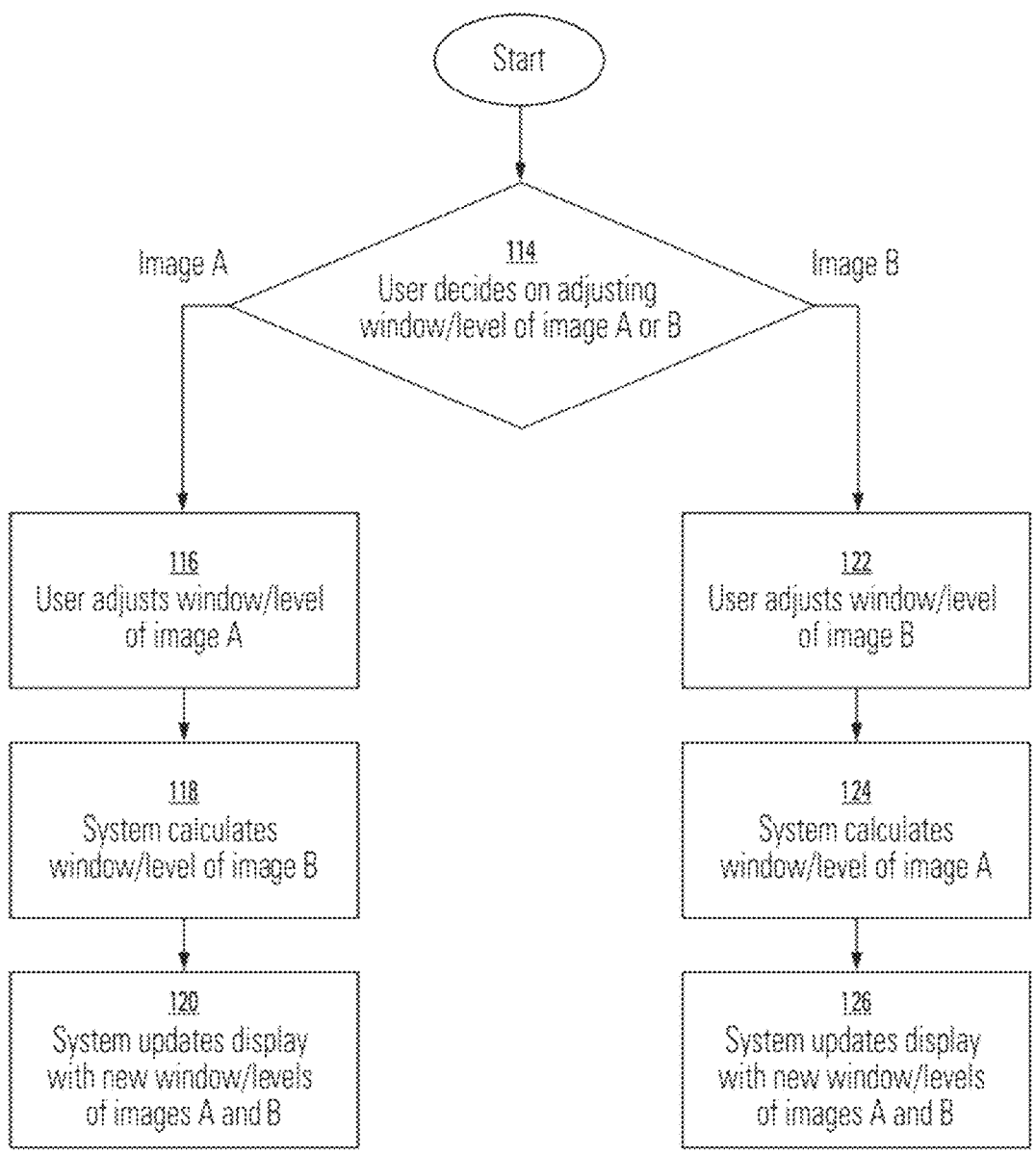
FIG. 8 is a flow diagram illustrating the process for executing a synchronized window/level adjustment of multiple images in accordance with the present invention.

FIG. 8 is a flow diagram illustrating the process for executing a synchronized window/level adjustment for multiple images, which in this instance can be two or more images. A second aspect of the window/level adjustment platform as shown in the screen shot 58 in FIG. 3 is applied to a method for synchronous interactive modification of the window/level parameters of multiple images—for example, the first medical image 60 is obtained from a CT scanner and the second medical image 62 is obtained from a CBCT scanner. The method of synchronized window/level adjustment is applicable to any system that displays multiple medical images at the same time. This approach is not limited to blended views but may also use a separate image view, for example, for each image at a different region of the display 22. Each image view provides its own control for setting the window/level parameters of the corresponding image, or two controls if the images are presented in a blended view. Whenever the user interacts with one of the window/level controls 70, 72, not only are the parameters of the corresponding single image changing but those of all other images as well by using a synchronization mechanism. All image views and window/level controls are automatically updated accordingly. The synchronization mechanism takes as input the window/level parameters of the image the user is currently adjusting and computes as output the window/level parameters of a second image, which should be updated automatically. If the system 10 displays n images, then n−1 such synchronization mechanisms are required to update all images synchronously.

At step 114, the user decides whether to adjust the window/level parameters of the first image 60 or the second image 62. If the user selects to adjust the window/level parameters of the first image 60, the user adjusts the first window/level parameters of the first image 60 at step 116. In response to the adjustments to the first window/level parameters, at step 118, the window/level synchronization module 40 is configured to compute automatically the window/level of the second image 62. At step 120, the window/level synchronization module 40 is configured not only update the display with the updated window/levels of the first image 60, but also to propagate automatically the updated window/level parameters of the second image 62 on the same display or another display. When the user adjusts the window/level of one image, the window/level synchronization module 40 calculates automatically the window/level adjustments of other images and synchronizes the window/level adjustments of all images. The processor 12 of the computer system 10 then displays all of the images at the same time based on the respective window/level adjustments.

If the user selects to adjust the window/level parameters of the second image 62, at step 122, the user adjusts the second window/level parameters of the second image 62. In response to the adjustments to the second window/level parameters, at step 124, the window/level synchronization module 40 is configured to compute automatically the window/level of the first image 60. At step 126, the window/level synchronization module 40 is configured not only to update the display with the updated window/levels of the second image 62, but also to propagate automatically the updated window/level parameters of the first image 60 on the same display or another display. When the user adjusts the window/level of one image, the window/level synchronization module 40 calculates automatically the window/level adjustments of other images and synchronizes the window/level adjustments of all images. The processor 12 of the computer system 10 then displays all of the images at the same time based on the respective window/level adjustments. Such a synchronization mechanism can operate in various ways, depending on the type of images corresponding to the input and output image parameters, which are further described below with respect to FIGS. 9A-C.

Figure 9A:
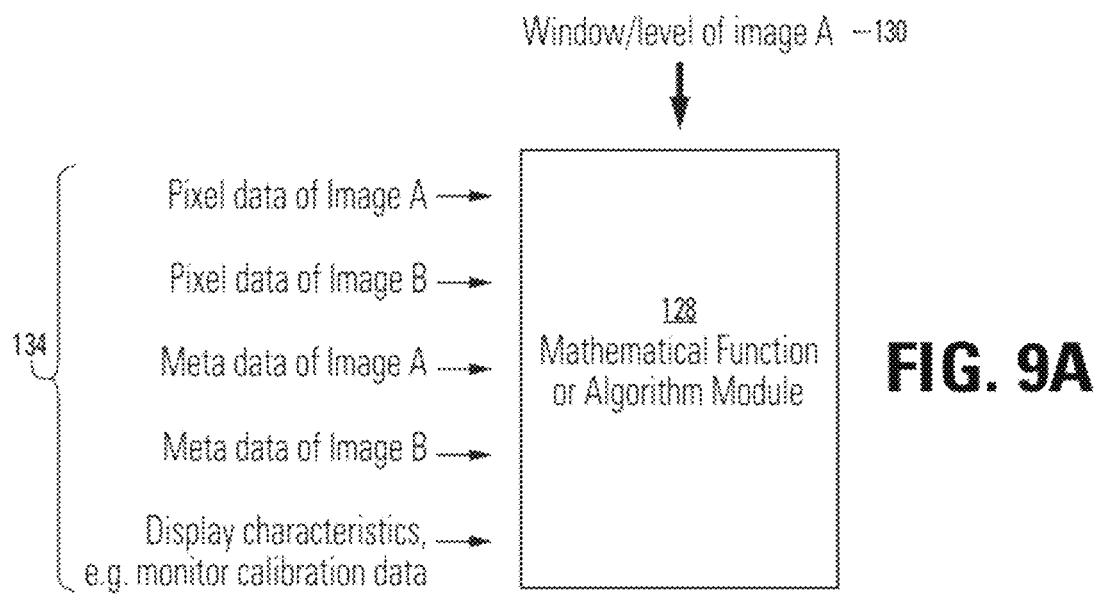
FIG. 9A is a block diagram illustrating a first embodiment of a general mapping method for executing a synchronized window/level adjustment of multiple images in accordance with the present invention.

FIG. 9A is a block diagram illustrating a first embodiment of a general mapping method for executing a synchronized window/level adjustment for multiple images as described in FIG. 8. In general, the synchronization mechanism can use any possible mapping between input and output parameters. This can be implemented by using mathematical expressions or lookup tables, some of which may be constructed empirically. With such mappings, it becomes possible to synchronize the window/level values of two images that have different modalities and/or that are displayed using different color maps. A mathematical function or algorithm module 128 receives an input 130 containing the window/level parameters associated with the first image 60, processes the window/level parameters of the first image 60, and generates an output 132 containing the window/level parameters of the second image 62. Other optional data inputs 134 that may be fed into the mathematical function or algorithm module 128 include the pixel data of the first image 60, the pixel data of the second image 62, the metadata of the first image 60, the metadata of the second image 62, and display characteristics, such as monitoring calibration data that appears on the display 22. The mathematical function or algorithm module 128 is executed as part of step 118 or 124, as shown in FIG. 8.

Figure 9B:
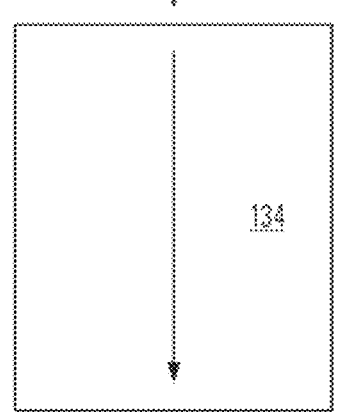
FIG. 9B is a block diagram illustrating a second embodiment of a pass-through method for executing a synchronized window/level adjustment of multiple images in accordance with the present invention.

FIG. 9B is a block diagram illustrating a second embodiment of a pass-through method for executing a synchronized window/level adjustment for multiple images as described in FIG. 8. The mechanism copies the input values and passes them directly to the output, resulting in an output 136 having the same data as the input 130. The pass-through method is most suitable if the input and output images are acquired by identical, calibrated scanners because identical window/level parameters result in a very similar visual appearance in that case.

Figure 9C:
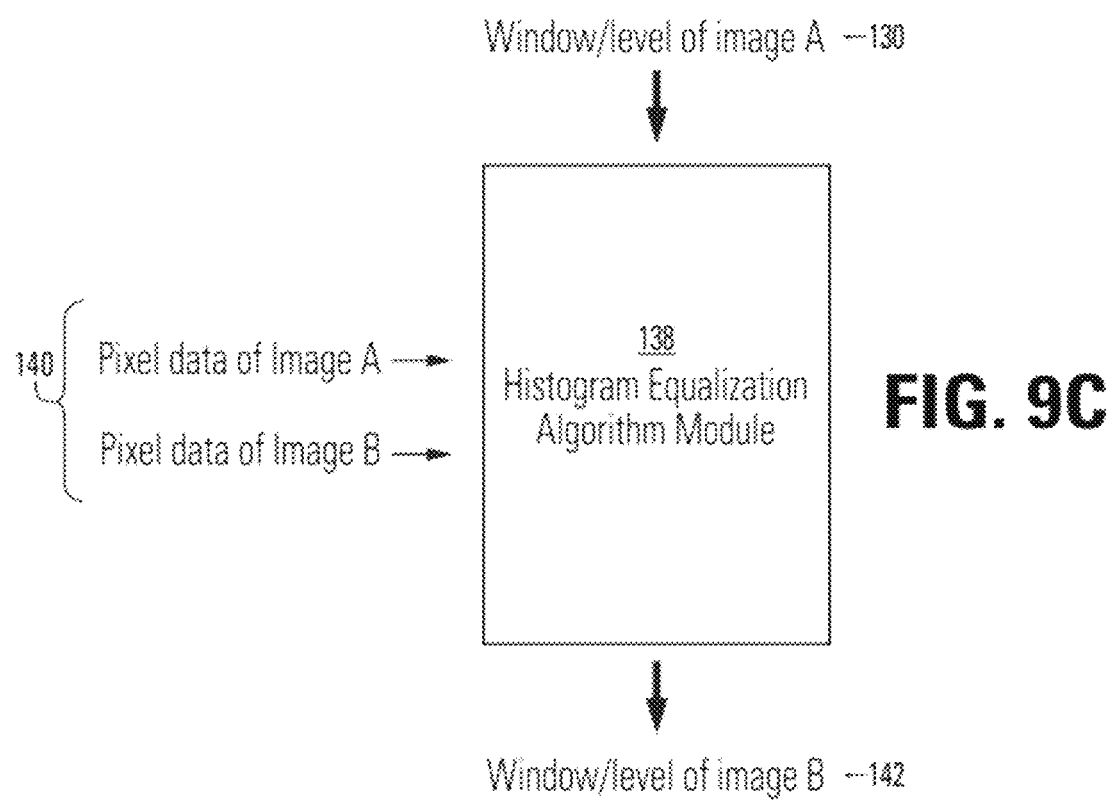
FIG. 9C is a block diagram illustrating a third embodiment of a histogram equalization method for executing a synchronized window/level adjustment of multiple images as described in FIG. 8 in accordance with the present invention.

FIG. 9C is a block diagram illustrating a third embodiment of a histogram equalization method for executing a synchronized window/level adjustment for multiple images as described in FIG. 8. If the two images 60, 62 are of the same modality but are generated by scanners from different manufacturers, the pass-through mechanism might produce unsatisfactory results, in which identical window/level parameters may produce a different visual contrast in the display. This is mainly caused by deviations in the scanner calibration routines and by scatter artifacts in the acquisition. The latter is especially visible if one image is acquired by a diagnostic CT scanner and the other one by a cone-beam CT scanner. In such situations, histogram equalization can produce results that are visually more similar. A histogram equalization algorithm module 138 is an optimization algorithm that tries to match the visual appearance of both displayed images as closely as possible. The histogram equalization algorithm module 138 is configured not only to consider the input 130 containing the window/level parameters associated with the first image 60, but also to take into account as inputs 140 containing the pixel data of the first image 60 and the pixel data of the second image 60. The histogram equalization algorithm module 138 generates an output 142 containing the window/level parameters of the second image 62 based on the collective inputs 130, 134.

Figure 10:
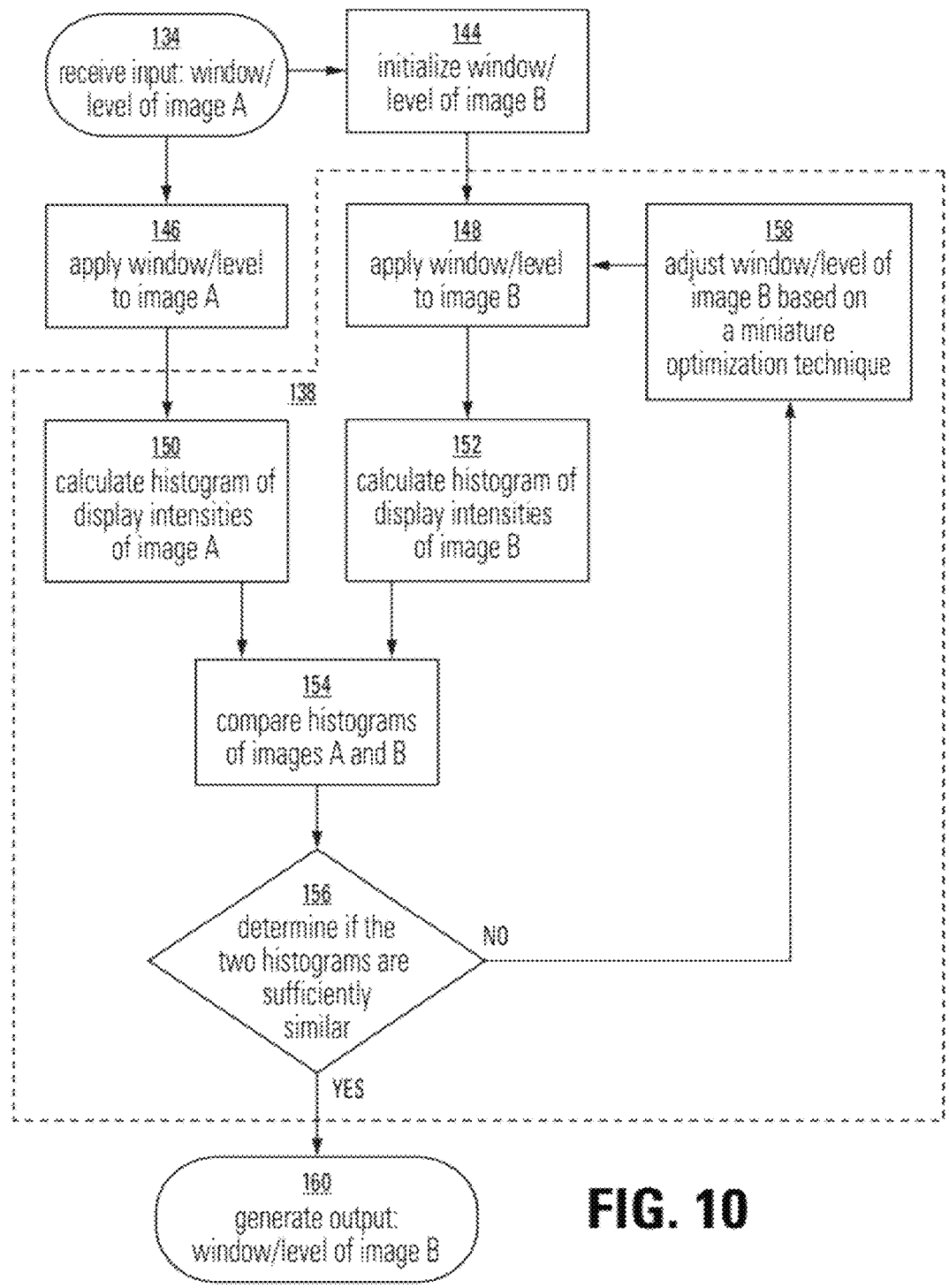
FIG. 10 is a flow diagram illustrating an exemplary histogram equalization process for executing a synchronized window/level adjustment of multiple images in accordance with the present invention.

FIG. 10 is a flow diagram illustrating an exemplary histogram equalization process for executing a synchronized window/level adjustment for multiple images. At step 130, the window/level input component 46 in the input module 42 is configured to receive a window/level of the first image 60. In an initialization step, the processor 12 first applies the input window/level parameters to all pixel intensity values of the corresponding input image to compute the display intensity values. The processor 12 initializes the window/level parameters of the second image 62 at step 144. In parallel steps 146, 148, the processor 12 applies the window/level parameters associated with the first image to the first image 60, and applies the window/level parameters associated with the second image to the second image 62. All resulting values are then accumulated in a histogram which counts for each possible display intensity the number of image pixels having that value. After initialization, the window/level synchronization module 40 is configured to start an optimization loop based on the histogram equalization algorithm 138. Each iteration of that loop chooses a set of output window/level parameters which are applied to the corresponding output image to calculate a histogram of its display intensity values. The processor 12 calculates a histogram of display intensities of the first image 60 at step 150, and calculates a histogram of display intensities of the second image 62 at step 152. At step 154, the processor 12 compares the first histogram of the first image 60 with the second histogram of the second image 62 using a similarity function. For example, a suitable similarity function is a modified normalized cross-correlation. At step 156, the processor 12 determines if the first histogram associated with the first image 60 is sufficiently similar to the second histogram associated with the second image 62. If the processor 12 determines that the first histogram is not sufficiently similar to the second histogram, the optimization loop 138 is repeated by adjusting the window/level parameters of the second image 62 at step 158 until that function yields a maximum similarity between both histograms. Some suitable miniature optimization techniques include Brute Force, Downhill-Simplex, and Gradient Descent. When the processor 12 determines that the first histogram is sufficiently similar to the second histogram, the processor 12 generates an output 160 containing the window/level of the second image 62.

The capabilities described in the various embodiments of the present invention to interactively adjust window/level parameters of multiple images in a blended view and synchronously adjust window/level parameters of multiple images can assist physicists, oncologists, and cardiologists to diagnose and design a treatment plan for patients. A radiation oncologist may analyze two medical images where the first image was taken by a CT scanner before the patient had developed a tumor, and compare it with the second image taken by the CT scanner after the patient had developed the tumor to analyze the tumor progression.

The first and second images 60, 62 in the illustrated embodiment are preferably a first medical image and a second medical image. Alternatively, various formats of the first and second images 60, 62, including two-dimensional (2D) or three-dimensional (3D) images, or 2D or 3D videos, are applicable to all of the embodiments described in the present invention. Note that the histogram equalization has to be computed globally on the whole N-dimensional image or video and not just on the currently visible part. To phrase it in another way, sample pixels are evenly selected over the whole image spectrum. For speedup on large data sets, the histogram equalization may use a deterministic or random subset of the pixels as long as it is distributed evenly over the whole data set.

In some embodiments with 3D images or videos, the display can be one or more 2D slice views or 3D volume renderings or a combination of both. Embodiments of the methods can be applied to multi-channel images/videos that store more than one intensity value per pixel, for example RGB triplets. In some embodiments, the output does not have to use gray-scale intensities where the methods may also use various color maps. The methods can be applied to any high-dynamic range images or videos, not necessarily from the medical field, such as from a photography field.

In some embodiments, one of the first and second medical images 60, 62 comprises an expert case. For example, an expert case is a disease-matched expert case with a set of target volume contours that provide outlines of different CT images for radiotherapy treatment. The first medical image 60 can be supplied from an expert case through a user interface, which provides an expert contour, and the expert contour is overlaid with the second medical image 62 that includes a patient image. For additional information on some, most, or all of the functions of a method relating to the selection of a set of target volume contours based of a disease-matched expert case, see U.S. Pat. No. 7,995,813 entitled "Reducing Variation in Radiation Treatment Therapy Planning," owned by the assignee of this application and incorporated by reference as if fully set forth herein.

Figure 11:
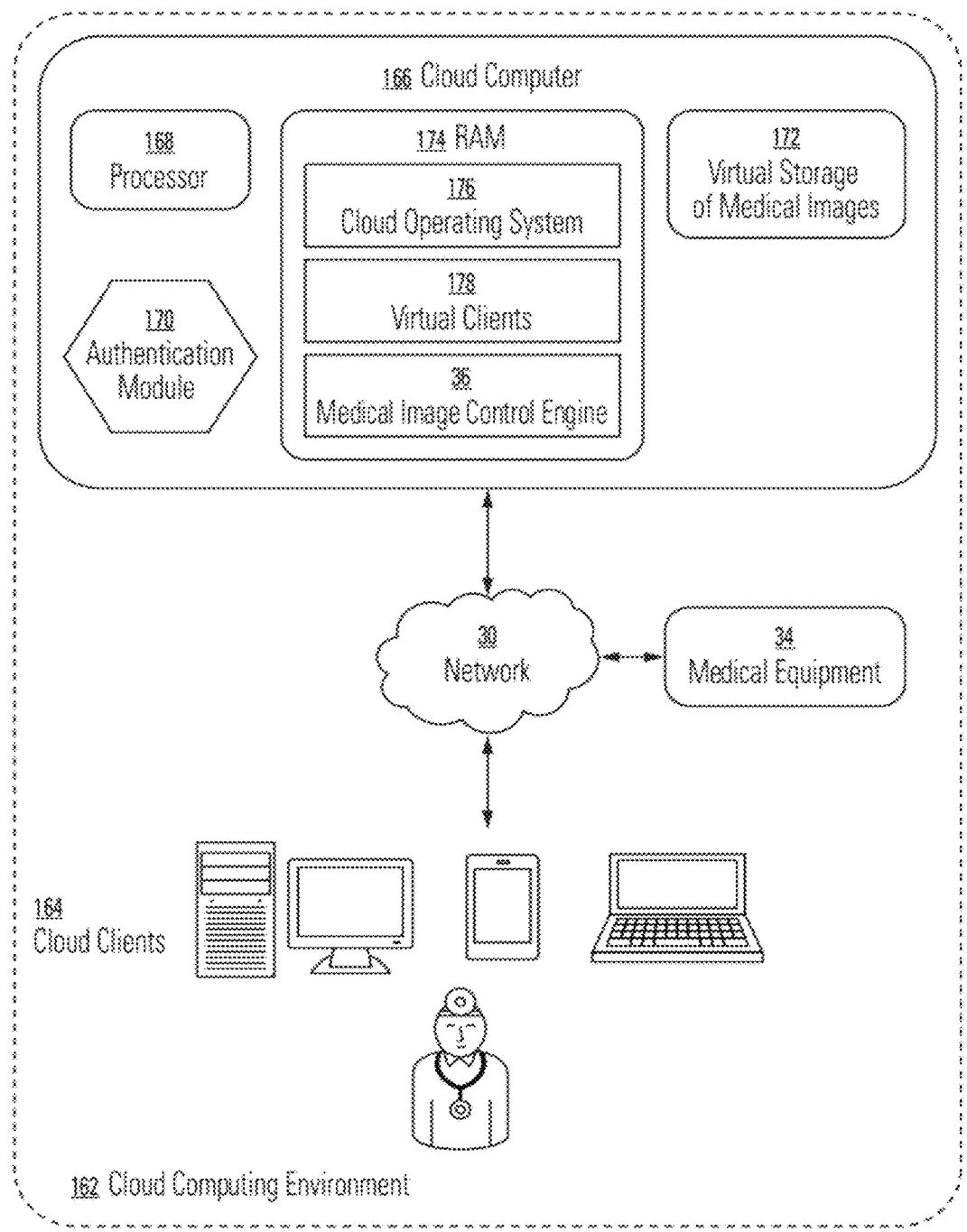
FIG. 11 is a block diagram illustrating a second system embodiment of a cloud computing environment accessible by cloud clients for a physician to view and adjust window/level parameters of multiple image displays in accordance with the present invention.

FIG. 11 is a block diagram illustrating the second system embodiment of a cloud computing environment 162 accessible by cloud clients 164 for a physician to view and adjust window/level parameters of multiple image displays. A cloud computer 166 running a cloud operating system 176, which may include other additional cloud computers, for data communications. The cloud clients 164 communicate with the cloud computer 166 through the network 30, either wirelessly by via a wired connection. The cloud clients 164 are broadly defined to include, but not limited to, desktop computers, mobile devices, notebook computers, SmartTVs, and SmartAutos. A variety of mobile devices are applicable to the present invention including mobile phones, smartphones like iPhones, tablet computers like iPads, and browser-based notebook computers like Chromebooks, with a processor, a memory, a screen, with connection capabilities of Wireless Local Area Network (WLAN) and Wide Area Network (WAN). The mobile device is configured with a full or partial operating system (OS) software which provides a platform for running basic and advanced software applications. The mobile device functioning as the cloud client 164 accesses the cloud computer 166 through a web browser.

In this embodiment, the cloud computer 166 (also referred to as a web/HTTP server) comprises a processor 168, an authentication module 170, a virtual storage of medical images 172, a RAM 174 for executing a cloud operating system 176, virtual clients 178, and the medical image control engine 36. The cloud operating system 176 can be implemented as a module of automated computing machinery installed and operating on one of the cloud computers. In some embodiments, the cloud operating system 176 can include several submodules for providing its intended functional features, such as the virtual clients 178, the medical image control engine 36, and the virtual storage 172.

In an alternate embodiment, the authentication module 170 can be implemented as an authentication server. The authentication module 170 is configured to authenticate, and grant permission, whether the cloud client 164 is an authorized user to access one or more medical images associated with a particular patient in the virtual storage 180. The authentication server 30 may employ a variety of authentication protocols to authenticate the user, such as a Transport Layer Security (TLS) or Secure Socket Layer (SSL), which are cryptographic protocols that provide security for communications over networks like the Internet.

Medical images, which include the first medical image 60 and the second medical image 62, can be stored in the virtual storage 180 of the cloud computer 166 in the cloud computing environment 162. The cloud client 162, such as a smartphone or a tablet computer, is capable of accessing the virtual storage 180 in the cloud computer 166 through the network 30 and displays medical images on the display of the cloud client 162. A physician would be able to view, and adjust, the medical images from a remote location on a handheld device.

In one embodiment, the cloud computer 166 is a browser-based operating system communicating through an Internet-based computing network that involves the provision of dynamically scalable and often virtualized resources as a service over the Internet, such as iCloud® available from Apple Inc. of Cupertino, Calif., Amazon Web Services (IaaS) and Elastic Compute Cloud (EC2) available from Amazon.com, Inc. of Seattle, Wash., SaaS and PaaS available from Google Inc. of Mountain View, Calif., Microsoft Azure Service Platform (Paas) available from Microsoft Corporation of Redmond, Wash., Sun Open Cloud Platform available from Oracle Corporation of Redwood City, Calif., and other cloud computing service providers.

The web browser is a software application for retrieving, presenting, and traversing a Uniform Resource Identifier (URI) on the World Wide Web provided by the cloud computer 166 or web severs. One common type of URI begins with Hypertext Transfer Protocol (HTTP) and identifies a resource to be retrieved over the HTTP. A web browser may include, but is not limited to, browsers running on personal computer operating systems and browsers running on mobile phone platforms. The first type of web browsers may include Microsoft's Internet Explorer, Apple's Safari, Google's Chrome, and Mozilla's Firefox. The second type of web browsers may include the iPhone OS, Google Android, Nokia S60 and Palm WebOS. Examples of a URI include a web page, an image, a video, or other type of content.

The network 30 can be implemented as a wireless network, a wired network protocol or any suitable communication protocols, such as 3G (3rd generation mobile telecommunications), 4G (fourth-generation of cellular wireless standards), long term evolution (LTE), 5G, a wide area network (WAN), Wi-Fi™ like wireless local area network (WLAN) 802.11n, or a local area network (LAN) connection (internetwork-connected to either WAN or LAN), Ethernet, Bluebooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol and other types of networks like a satellite, a cable network, or an optical network set-top boxes (STBs).

A SmartAuto includes an auto vehicle with a processor, a memory, a screen, with connection capabilities of Wireless Local Area Network (WLAN) and Wide Area Network (WAN), or an auto vehicle with a telecommunication slot connectable to a mobile device like iPods, iPhones, and iPads.

A SmartTV includes a television system having a telecommunication medium for transmitting and receiving moving video images (either monochromatic or color), still images and sound. The television system operates as a television, a computer, an entertainment center, and a storage device. The telecommunication medium of the television system includes a television set, television programming, television transmission, cable programming, cable transmission, satellite programming, satellite transmission, Internet programming, and Internet transmission.

Some portions of the above description describe the embodiments in terms of algorithmic descriptions and processes, e.g. as with the description within FIGS. 1-11. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIGS. 1-11. Furthermore, it has also proven convenient at times to refer to these arrangements of operations as modules, without loss of generality. The operations described and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to "an inclusive or" and "not to an exclusive or". For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to one possible embodiment. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A computer-implemented method for adjusting a presentation of a plurality of medical images on a display, the computer-implemented method comprising:
   displaying a first medical image having first three-dimensional voxel data and a second medical image having second three-dimensional voxel data in a 3-D blended view of a set of 3-D merged images on a display, the first image associated with first contrast parameters and the second image associated with second contrast parameters, the first image and the second image being sourced from a medical image scanner, the display in communication with the medical image scanner, the set of merged images being sourced from the first image and the second image;

adjusting the first contrast parameters and the first three-dimensional voxel data in the first image via a user interface output via the display, representing a first event, thereby automatically causing a 3-D transparency blending factor to change to display only the first image via the display, the 3-D transparency blending factor reverting back to an initial value to display both the first and second images via the display upon ending the adjustment of the contrast parameters; and adjusting the contrast parameters of the first and second three-dimensional voxel data simultaneously via the user interface by correlating the image content of the first and second three-dimensional voxel data, representing a second event, thereby automatically causing the 3D transparency blending factor to change to display only the second image via the display, the transparency blending reverting back to the initial value that displays both the first and second images via the display upon ending the adjustment of the contrast parameters;

wherein the 3-D transparency blending factor is synchronized automatically between the first event and the second event based on a synchronization relationship of the first image upon adjustment of the first contrast parameters via the user interface to effectuate the set of merged images between the first three-dimensional voxel data and the second three-dimensional voxel data, the synchronization relationship comprises mapping window/level parameters of the second image from the input window/level parameters of the first image, pixel data of the first image, pixel data of the second image, metadata of the first image, metadata of the second image and characteristics of a display, the synchronization relationship comprises passing through the input window/level parameters of the first image to the window/level parameters of the second image.

2. The method as recited in claim 1, wherein the adjusting step comprises adjusting the first contrast parameters in the first image causing the transparency blending factor to slide completely in a first direction, the first image being fully opaque and the second image being fully transparent when the transparency blending factor is at the first value.

3. The method as recited in claim 1, wherein the adjusting step comprises adjusting the second contrast parameters in the second image causing the transparency blending factor to slide completely in a second direction, wherein the second image is fully opaque and the first image is fully transparent when the transparency blending factor is at the second value.

4. The method as recited in claim 1, wherein the value of the transparency blending factor ranges from zero to one.

5. The method as recited in claim 1, wherein the second displaying step comprises both the first and second images being semi-transparent and semi-opaque.

6. The method as recited in claim 1, wherein the first displaying step comprises displaying a first control region associated with first contrast parameters of the first image; and displaying a second control region associated with the second contrast parameters of the second image.

7. The method as recited in claim 6, wherein the adjusting step is directed by an input device for selecting the adjustment in the first control region affecting the first image without affecting the second image, or selecting the adjustment in the second control region affecting the second image without affecting the first image.

8. The method as recited in claim 6, wherein the first control region has a first predetermined invisible area on the display that is responsive to a directing action by an input device placed within the first control region, and the second control region has a second predetermined invisible area on the display that is responsive to the directing action by the input device placed within the second control region.

9. The method as recited in claim 6, wherein the first control region has a first predetermined invisible area on the display that is responsive to a directing action by an input device placed within the first control region, the second control region has a second predetermined invisible area on the display that is responsive to the directing action by the input device placed within the second control region, the directing action in the first control region being independent of the directing action in the second control region.

10. The method as recited in claim 6, wherein the first control region has a first predetermined invisible area on the display that is responsive to a directing action by an input device placed within the first control region, the directing action simultaneously causing a combination of increased transparency and increased zooming such that the first image become more transparent and enlarged.

11. The method as recited in claim 1, prior to the first displaying step, further comprising scanning the first image and the second image, wherein the scanning step is performed by at least one scanner from the group of scanners consisting of an x-ray scanner, a computerized tomographic (CT) scanner, a cone beam computerized tomographic (CBCT) scanner, a magnetic resonance imaging (MRI) scanner, a positron emission tomographic (PET) scanner, and an ultrasound scanner.

12. The method as recited in claim 1, wherein the first image comprises a first medical image obtained from a first medical image scanner, and the second image comprises a second medical image obtained from the first medical imaging scanner.

13. The method as recited in claim 1, wherein the first image comprises a first medical image obtained from a first medical image scanner, and the second image comprises a second medical image obtained from a second medical imaging scanner.

14. The method as recited in claim 1, wherein the first and second images comprise two-dimensional (2D) images, three-dimensional (3D) images, 2D videos, and 3D videos, and any combination of these.

15. The method as recited in claim 1, wherein the first image comprises a disease-matched expert case with a set of target volume contours providing outlines of different computerized tomographic (CT) images, the second image including a first medical image obtained from a first medical scanner and overlaying the first image.

16. The method as recited in claim 1, wherein the first and second images comprise two-dimensional (2D) slices of a three-dimensional (3D) image.

17. The method as recited in claim 1, wherein the first and second images comprise three-dimensional (3D) volume renderings.

18. The method of claim 1, further comprising
adjusting the first contrast parameters and the first three-dimensional voxel data in the first image via a user interface, representing a third event, thereby automatically causing a transparency blending factor to change to display only the first image, the transparency blending factor reverting back to an initial value to display both the first and second images upon ending the adjustment of the contrast parameters; and adjusting the second contrast parameters and second three-dimensional voxel data in the second image via the user interface, representing a fourth event, thereby automatically causing the transparency blending factor to change to display only the second image, the transparency blending reverting back to the initial value that displays both the first and second images upon ending the adjustment of the contrast parameters;

wherein a first location of the merged images in the first event and the second event appears to be changed to a second location of the merged images in the third event and the fourth event dependent on the adjustment to the first contrast parameters and the second contrast parameters, the degree of transparency and opaqueness of the first image having an inverse relationship with the transparency and opaqueness of the second image.

19. A computer-implemented method for interactive control of a plurality of medical images, the computer-implemented method comprising:

receiving input window/level parameters of a first medical image sourced from a medical image scanner, the first image comprises first three-dimensional voxel data;

adjusting the input window/level parameters of the first image with updated window/level parameters associated with the first image;

responsive to the adjusting step, automatically computing window/level parameters of a second medical image with updated window/level parameters associated with the second image, the second image comprises second three-dimensional voxel data the updated window/level parameters of the second image being computed based on a synchronization relationship with the input window/level parameters of the first image, the second image sourced from the medical image scanner, the synchronization relationship comprises mapping window/level parameters of the second image from the input window/level parameters of the first image, pixel data of the first image, pixel data of the second image, metadata of the first image, metadata of the second image and characteristics of a display, the synchronization relationship comprises passing through the input window/level parameters of the first image to the window/level parameters of the second image; and simultaneously displaying, via a display, the first image with the updated window/level parameters associated with the first image and the second image with the updated window/level parameters associated with the second image, the medical image scanner in communication with the display.

20. The method as recited in claim 19, wherein the response step comprises calculating a plurality of window/level parameters associated with a plurality of images, each image in the plurality of images having respective updated window/level parameters; and wherein the simultaneously displaying step comprises simultaneously displaying the first image with the updated window/level parameters associated with the first image, the second image with the updated window/level parameters associated with the second image, and the plurality of images with the updated window/level parameters.

21. The method as recited in claim 19, wherein the synchronization relationship in the calculating step comprises mapping the updated window/level parameters of the second image from the input window/level parameters of the first image, pixel data of the first image, pixel data of the second image, metadata of the first image, metadata of the second image and characteristics of a display.

22. The method as recited in claim 19, wherein the synchronization relationship in the calculating step comprises passing through the input window/level parameters of the first image to the updated window/level parameters of the second image.

23. The method as recited in claim 19, wherein the synchronization relationship in the calculating step comprises a histogram equalization of the first image and the second image by comparing a first histogram of display intensities of the first image with a second histogram of display intensities of the second image.

24. The method as recited in claim 23, wherein the histogram equalization comprises further adjusting the window/level parameters of the second image based on a miniature optimization technique if the first histogram of display intensities of the first image is insufficiently similar to the second histogram of display intensities of the second image.

25. The method as recited in claim 23, wherein the histogram equalization comprises generating an output of the window/level associated with the second image if the first histogram of display intensities of the first image is substantially similar to the second histogram of display intensities of the second image.

26. The method as recited in claim 19, prior to the first displaying step, further comprising scanning the first image and the second image, wherein the scanning step is performed by at least one scanner from the group of scanners consisting of an x-ray scanner, a computerized tomographic (CT) scanner, a cone beam computerized tomographic (CBCT) scanner, a magnetic resonance imaging (MRI) scanner, a positron emission tomographic (PET) scanner, and an ultrasound scanner.

27. The method as recited in claim 19, wherein the first image comprises a first medical image obtained from a first medical image scanner, and the second image comprises a second medical image obtained from the first medical imaging scanner.

28. The method as recited in claim 19, wherein the first image comprises a first medical image obtained from a first medical image scanner, and the second image comprises a second medical image obtained from a second medical imaging scanner.

29. The method as recited in claim 19, wherein the first and second images comprise two-dimensional (2D) images, three-dimensional (3D) images, 2D videos, and 3D videos, and any combination of these.

30. A system for adjusting a plurality of medical images, the system comprising:

an input module configured to receive input window/level parameters of a first medical image and to initialize window/level parameters of a second medical image, the first image and the second image are sourced from a medical image scanner, the first image comprises first three-dimensional voxel data, the second image comprises second three-dimensional voxel data;

a window/level application component configured to generate updated window/level parameters of the first image;

a window/level synchronization module configured to compute updated window/level parameters of the second image, the updated window/level parameters of the second image being computed automatically based on a synchronization relationship with the input window/level parameters of the first image, wherein the synchronization relationship comprises mapping window/level parameters of the second image from the input window/level parameters of the first image, pixel data of the first image, pixel data of the second image, metadata of the first image, metadata of the second image and characteristics of a display, wherein the synchronization relationship comprises passing through the input window/level parameters of the first image to the window/level parameters of the second image; and a display module for simultaneously displaying, via a display, the first image with the updated window/level parameters associated with the first image and the second image with the updated window level parameters associated with the second image, the medical image scanner in communication with the display.

31. The system as recited in claim 30, wherein the synchronization relationship in the calculating step comprises mapping the updated window/level parameters of the second image from the input window/level parameters of the first image, pixel data of the first image, pixel data of the second image, metadata of the first image, metadata of the second image and characteristics of a display.

32. The system as recited in claim 30, wherein the synchronization relationship in the calculating step comprises passing through the input window/level parameters of the first image to the updated window/level parameters of the second image.

33. The system as recited in claim 30, wherein the synchronization relationship in the calculating step comprises a histogram equalization of the first image and the second image by comparing a first histogram of display intensities of the first image with a second histogram of display intensities of the second image.

34. The system as recited in claim 33, wherein the histogram equalization comprises further adjusting the window/level parameters of the second image based on a miniature optimization technique if the first histogram of display intensities of the first image is insufficiently similar to the second histogram of display intensities of the second image.

35. The system as recited in claim 33, wherein the histogram equalization comprises generating an output of the window/level associated with the second image if the first histogram of display intensities of the first image is substantially similar to the second histogram of display intensities of the second image.

36. The system as recited in claim 30, further comprising at least one scanner for scanning the first and second images, wherein the at least one scanner is selected from the group of scanners consisting of an x-ray scanner, a computerized tomographic (CT) scanner, a cone beam computerized tomographic (CBCT) scanner, a magnetic resonance imaging (MRI) scanner, a positron emission tomographic (PET) scanner, and an ultrasound scanner.

37. The system as recited in claim 30, wherein the first image comprises a first medical image obtained from a first medical image scanner, and the second image comprises a second medical image obtained from the first medical imaging scanner.

38. The system as recited in claim 30, wherein the first image comprises a first medical image obtained from a first medical image scanner, and the second image comprises a second medical image obtained from a second medical imaging scanner.

39. The system as recited in claim 30, wherein the first and second images comprise two-dimensional (2D) images, three-dimensional (3D) images, 2D videos, and 3D videos, and any combination of these.

40. A non-transitory computer program product comprising a computer readable storage medium structured to store instructions executable by a processor, the instructions, when executed, cause the processor to:

first display a first medical image from a first three-dimensional voxel data and a second medical image from a second three-dimensional voxel data in a 3-D blended view of a set of 3-D merged images on a display, the first image associated with first contrast parameters and the second image associated with second contrast parameters, the first image and the second images are sourced from a medical image scanner, the display in communication with the medical image scanner, the set of merged images is sourced from the first image and the second image;

adjust the first contrast parameters and the first three-dimensional voxel data in the first image via a user interface output via the display, representing a first event, thereby automatically causing a 3-D transparency blending factor to change display only the first image via the display, the 3-D transparency blending factor reverting back to an initial value to display both the first and second images via the display upon ending the adjustment of the contrast parameters; and adjust the contrast parameters of the first and second three-dimensional voxel data simultaneously via the user interface by correlating the image content of the first and second three-dimensional voxel data, representing a second event, thereby causes the transparency blending factor to change to display only the second image via the display, the transparency blending reverting back to the initial value that displays both images via the display upon ending the adjustment of the contrast parameters;

wherein the 3-D transparency blending factor is synchronized automatically between the first event and the second event based on a synchronization relationship of the first image upon adjustment of the first contrast parameters via the user interface to effectuate the set of merged images between the first three-dimensional voxel data and the second three-dimensional voxel data, the synchronization relationship comprises mapping window/level parameters of the second image from the input window/level parameters of the first image, pixel data of the first image, pixel data of the second image, metadata of the first image, metadata of the second image and characteristics of a display, the synchronization relationship comprises passing through the input window/level parameters of the first image to the window/level parameters of the second image.

41. A non-transitory computer program product for adjusting multiple medical images, the computer program product being stored on a computer readable storage medium and comprising:

program code for receiving an input window/level parameters of a first medical image sourced from a medical image scanner, the first image comprises first three-dimensional voxel data;

program code for adjusting the input window/level parameters of the first image with updated window/level parameters associated with the first image;

responsive to the adjusting step, program code for computing window/level parameters of a second medical image with updated window/level parameters associated with the second image, the second image comprises second three-dimensional voxel data, the updated window/level parameters of the second image being computed based on a synchronization relationship with the input window/level parameters of the first image, the second image sourced from the medical image scanner, the synchronization relationship comprises mapping window/level parameters of the second image from the input window/level parameters of the first image, pixel data of the first image, pixel data of the second image, metadata of the first image, metadata of the second image and characteristics of a display, the synchronization relationship comprises passing through the input window/level parameters of the first image to the window/level parameters of the second image; and program code for simultaneously displaying, via a display, the first image with the updated window/level parameters associated with the first image and the second image with the updated window level parameters associated with the second image, the medical image scanner in communication with the display.

* * * * *